United States Patent
Sloane et al.

(10) Patent No.: US 12,113,801 B2
(45) Date of Patent: Oct. 8, 2024

(54) SYSTEM AND METHOD FOR MAINTAINING NETWORK SECURITY IN A MESH NETWORK BY ANALYZING IP STACK LAYER INFORMATION IN COMMUNICATIONS

(71) Applicant: BANK OF AMERICA CORPORATION, Charlotte, NC (US)

(72) Inventors: Brandon Sloane, Indian Land, SC (US); Michael Ogrinz, Easton, CT (US); Charles Edward Dudley, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 300 days.

(21) Appl. No.: 17/539,400

(22) Filed: Dec. 1, 2021

(65) Prior Publication Data
US 2023/0171260 A1 Jun. 1, 2023

(51) Int. Cl.
*H04L 9/40* (2022.01)

(52) U.S. Cl.
CPC .......... *H04L 63/105* (2013.01); *H04L 63/102* (2013.01); *H04L 63/123* (2013.01); *H04L 63/205* (2013.01)

(58) Field of Classification Search
CPC ... H04L 63/105; H04L 63/102; H04L 63/123; H04L 63/205; H04L 63/08; H04L 63/0861; H04L 63/107; H04L 63/20
See application file for complete search history.

(56) References Cited

U.S. PATENT DOCUMENTS

| | | |
|---|---|---|
| 8,270,382 B2 | 9/2012 | Cam-Winget et al. |
| 8,385,550 B2 | 2/2013 | Sun |
| 8,959,334 B2 | 2/2015 | Martin et al. |
| 9,098,705 B2 | 8/2015 | Tai et al. |
| 9,106,413 B2 | 8/2015 | Kim et al. |
| 9,110,101 B2 | 8/2015 | Pietrowicz et al. |
| 9,306,977 B2 | 4/2016 | Howe |
| 9,521,158 B2 | 12/2016 | Di Pietro et al. |
| 9,735,957 B2 | 8/2017 | Yadav et al. |
| 9,866,395 B2 | 1/2018 | Bruestle et al. |
| 9,942,824 B2 | 4/2018 | Veillette |
| 10,122,695 B2 | 11/2018 | Zhang et al. |
| 10,187,413 B2 | 1/2019 | Vasseur et al. |
| 10,389,736 B2 | 8/2019 | Dawes et al. |
| 10,440,546 B2 | 10/2019 | Polo et al. |

(Continued)

*Primary Examiner* — Anh Nguyen
(74) *Attorney, Agent, or Firm* — Moore & Van Allen PLLC; Nicholas C. Russell

(57) ABSTRACT

Systems, methods, and computer program products are provided for monitoring network security in a mesh network. An example method includes receiving trust of service information relating to a user. The trust of service information includes one or more security details associated with at least one of a user device or a user network associated with the user. The method also includes determining a security level of a session involving the user based on the trust of service information relating to the user. The method further includes determining a security protocol for the session based on the determined security level. The security protocol determines at least one of a user access level or an additional security measure. The method still further includes causing an execution of the session based on the security protocol determined.

20 Claims, 5 Drawing Sheets

(56) References Cited

U.S. PATENT DOCUMENTS

| | | |
|---|---|---|
| 10,601,664 B2 | 3/2020 | Kumar et al. |
| 10,666,523 B2 | 5/2020 | Dawes et al. |
| 10,805,175 B2 | 10/2020 | Stocker |
| 11,272,361 B2 | 3/2022 | Stephenson |
| 2012/0054847 A1* | 3/2012 | Schultz ................ H04L 9/3213 726/9 |
| 2013/0042298 A1* | 2/2013 | Plaza Fonseca ...... H04L 67/535 726/1 |
| 2014/0059649 A1* | 2/2014 | Hu .......................... H04L 63/08 726/3 |
| 2018/0242379 A1 | 8/2018 | Turon et al. |
| 2021/0037000 A1* | 2/2021 | Attard .................... G06N 20/00 |

\* cited by examiner

SYSTEM AND METHOD FOR MAINTAINING NETWORK SECURITY IN A MESH NETWORK BY ANALYZING IP STACK LAYER INFORMATION IN COMMUNICATIONS

TECHNOLOGICAL FIELD

An example embodiment relates generally to monitoring network security, and more particularly, to monitoring network security in a mesh network by analyzing IP stack layer information in communications.

BACKGROUND

In mesh networks, various devices are in communication and it can be difficult to verify sessions over said mesh networks. Since all devices on a mesh network are typically not controlled by the same entity, the integrity of the network communications can be compromised. Therefore, it is paramount that such communications are screened for security purposes. There exists a need for a system that can improve the security monitoring without requiring administrative access to each device on the mesh network.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for monitoring network security in a mesh network is provided. The system includes at least one non-transitory storage device and at least one processing device coupled to the at least one non-transitory storage device. The at least one processing device is configured to receive trust of service information relating to a user with the trust of service information including one or more security details associated with at least one of a user device or a user network associated with the user. The at least one processing device is also configured to determine a security level of a session involving the user based on the trust of service information relating to the user. The at least one processing device is further configured to determine a security protocol for the session based on the determined security level. The security protocol determines at least one of a user access level or an additional security measure. The at least one processing device is still further configured to cause an execution of the session based on the security protocol determined.

In some embodiments, the trust of service information is received from a user device associated with the user. In some embodiments, the trust of service information includes at least one of a user device location or a user device network type. In some embodiments, the security protocol includes limiting a transaction amount based on the security level.

In some embodiments, the trust of service information is stored within a stack layer of a communication with a user device. In some embodiments, the additional security measure includes requesting additional user verification information, and the at least one processing device is further configured to update the security level of the session based on a response to the request for additional user verification information. In some embodiments, the at least one processing device is further configured to cause the display of the security level to the user device prior to a completion of the session.

In another example embodiment, a computer program product for monitoring network security in a mesh network is provided. The computer program product includes at least one non-transitory computer-readable medium having computer-readable program code portions embodied therein. The computer-readable program code portions include an executable portion configured to receive trust of service information relating to a user with the trust of service information comprises one or more security details associated with at least one of a user device or a user network associated with the user. The computer-readable program code portions also include an executable portion configured to determine a security level of a session involving the user based on the trust of service information relating to the user. The computer-readable program code portions further include an executable portion configured to determine a security protocol for the session based on the determined security level. The security protocol determines at least one of a user access level or an additional security measure. The computer-readable program code portions still further include an executable portion configured to cause an execution of the session based on the security protocol determined.

In some embodiments, the trust of service information is received from a user device associated with the user. In some embodiments, the trust of service information includes at least one of a user device location or a user device network type. In some embodiments, the security protocol includes limiting a transaction amount based on the security level. In some embodiments, the trust of service information is stored within a stack layer of a communication with a user device.

In some embodiments, the additional security measure includes requesting additional user verification information and the computer-readable program code portions further include an executable portion configured to update the security level of the session based on a response to the request for additional user verification information. In some embodiments, the computer-readable program code portions further include an executable portion configured to cause the display of the security level to the user device prior to a completion of the session.

In still another example embodiment, a computer-implemented method for monitoring network security in a mesh network is provided. The method includes receiving trust of service information relating to a user with the trust of service information including one or more security details associated with at least one of a user device or a user network associated with the user. The method also includes determining a security level of a session involving the user based on the trust of service information relating to the user. The method further includes determining a security protocol for the session based on the determined security level. The security protocol determines at least one of a user access level or an additional security measure. The method still further includes causing an execution of the session based on the security protocol determined.

In some embodiments, the trust of service information is received from a user device associated with the user. In some embodiments, the trust of service information includes at least one of a user device location or a user device network type. In some embodiments, the security protocol includes limiting a transaction amount based on the security level.

In some embodiments, the trust of service information is stored within a stack layer of a communication with a user device. In some embodiments, the additional security measure includes requesting additional user verification information and the method further includes updating the security level of the session based on a response to the request for additional user verification information.

Embodiments of the present disclosure address the above needs and/or achieve other advantages by providing apparatuses (e.g., a system, computer program product and/or other devices) and methods for dynamically generating optimized data queries to improve hardware efficiency and utilization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
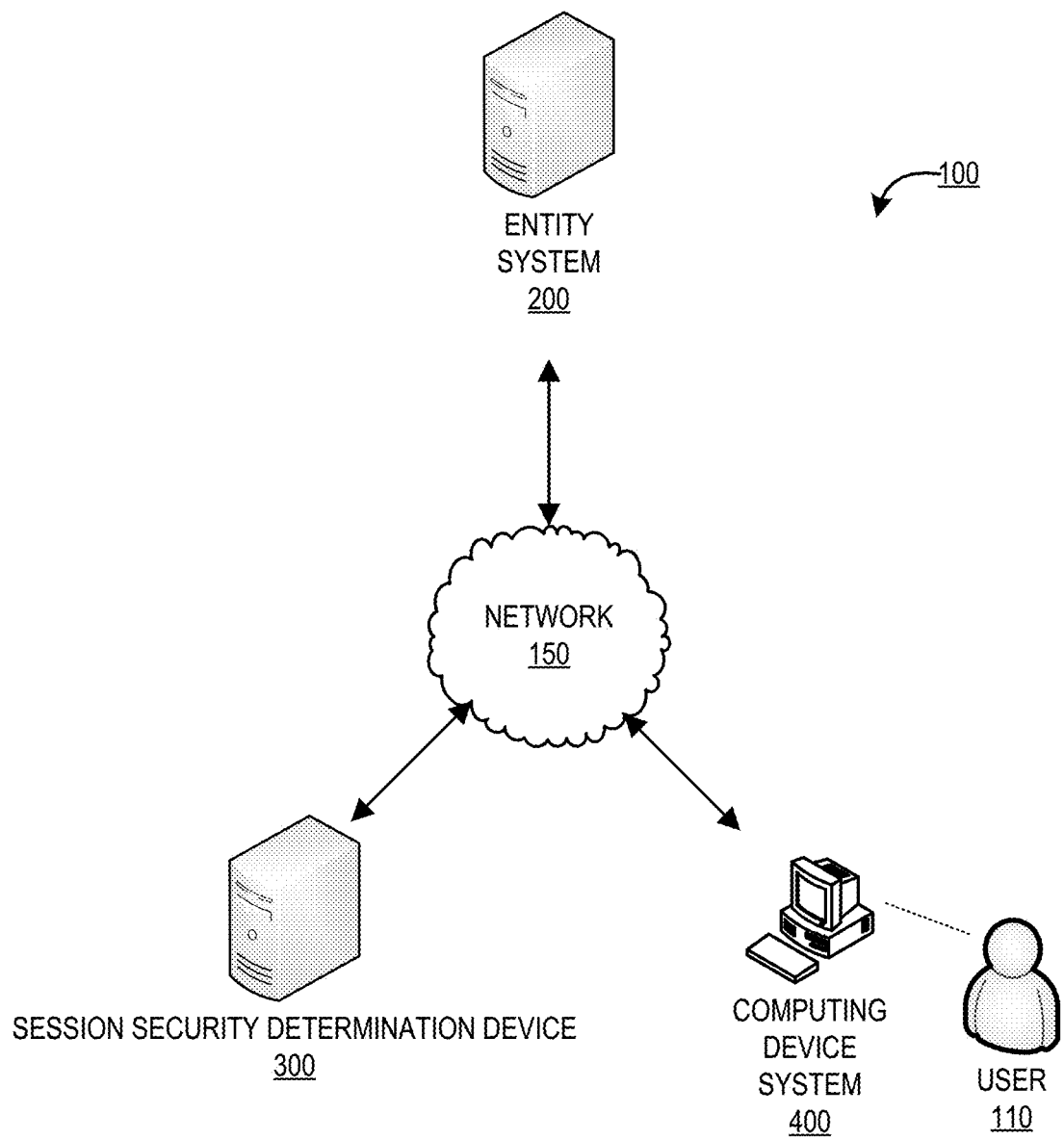
Figure 2:
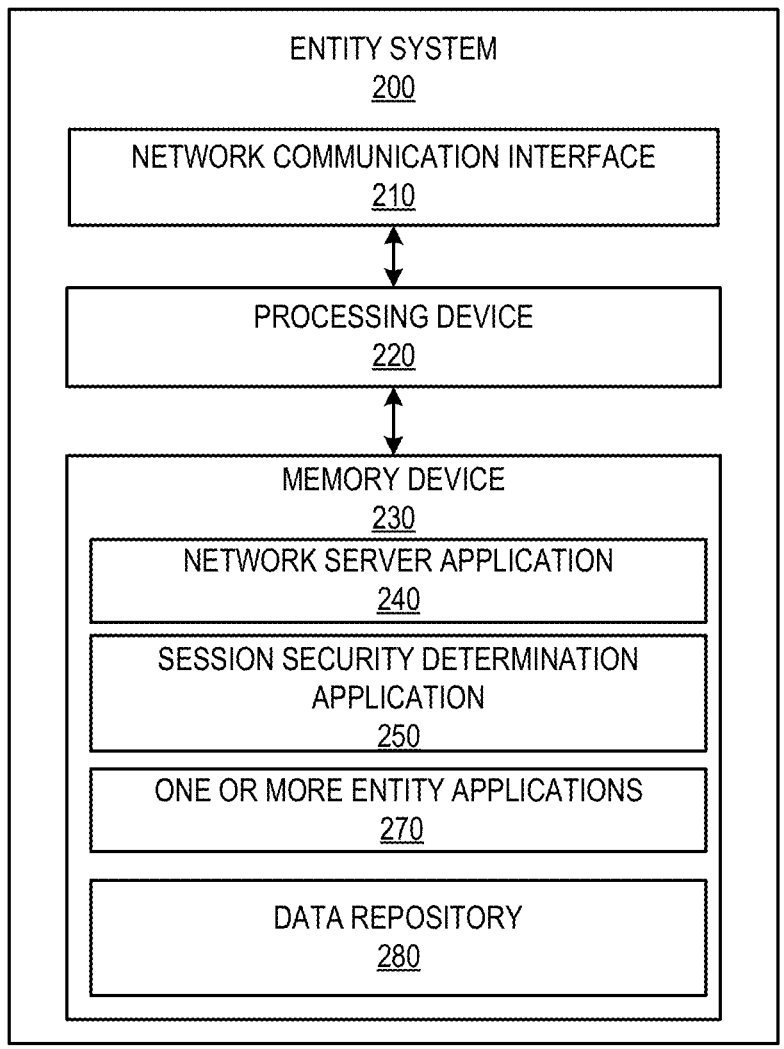
Figure 3:
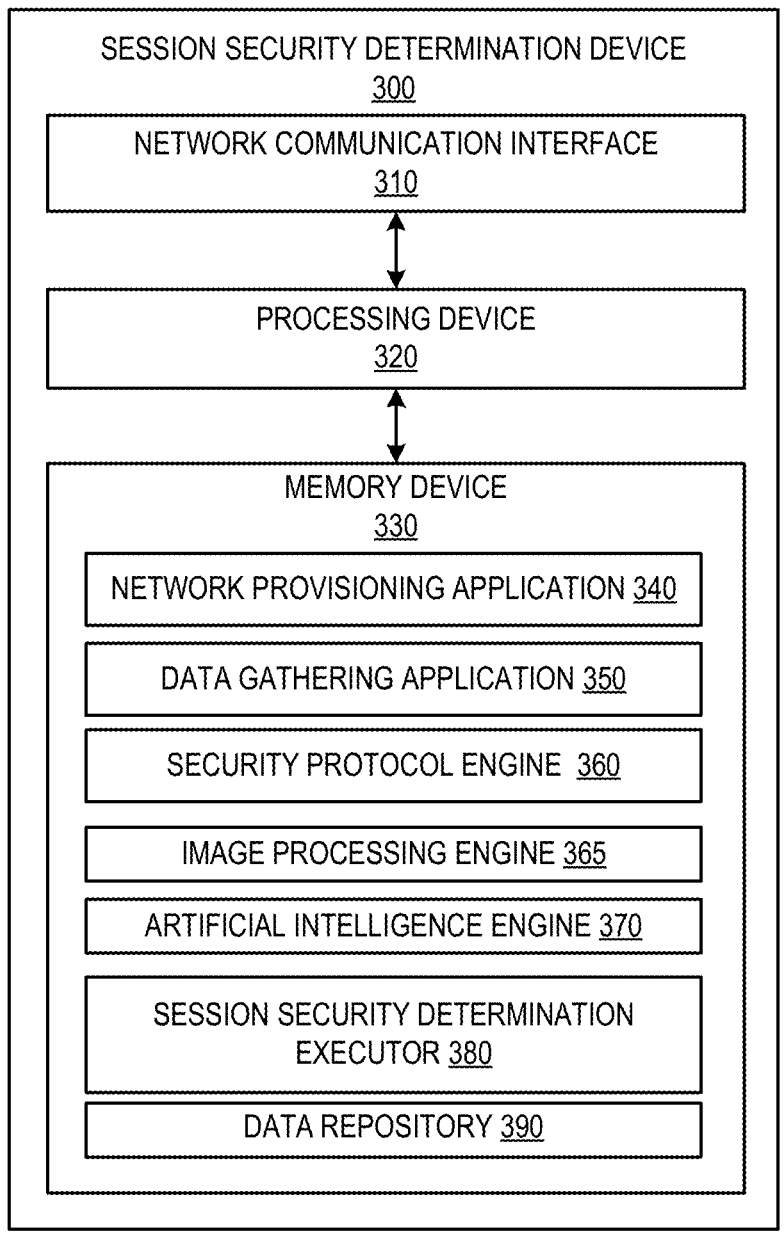
Figure 4:
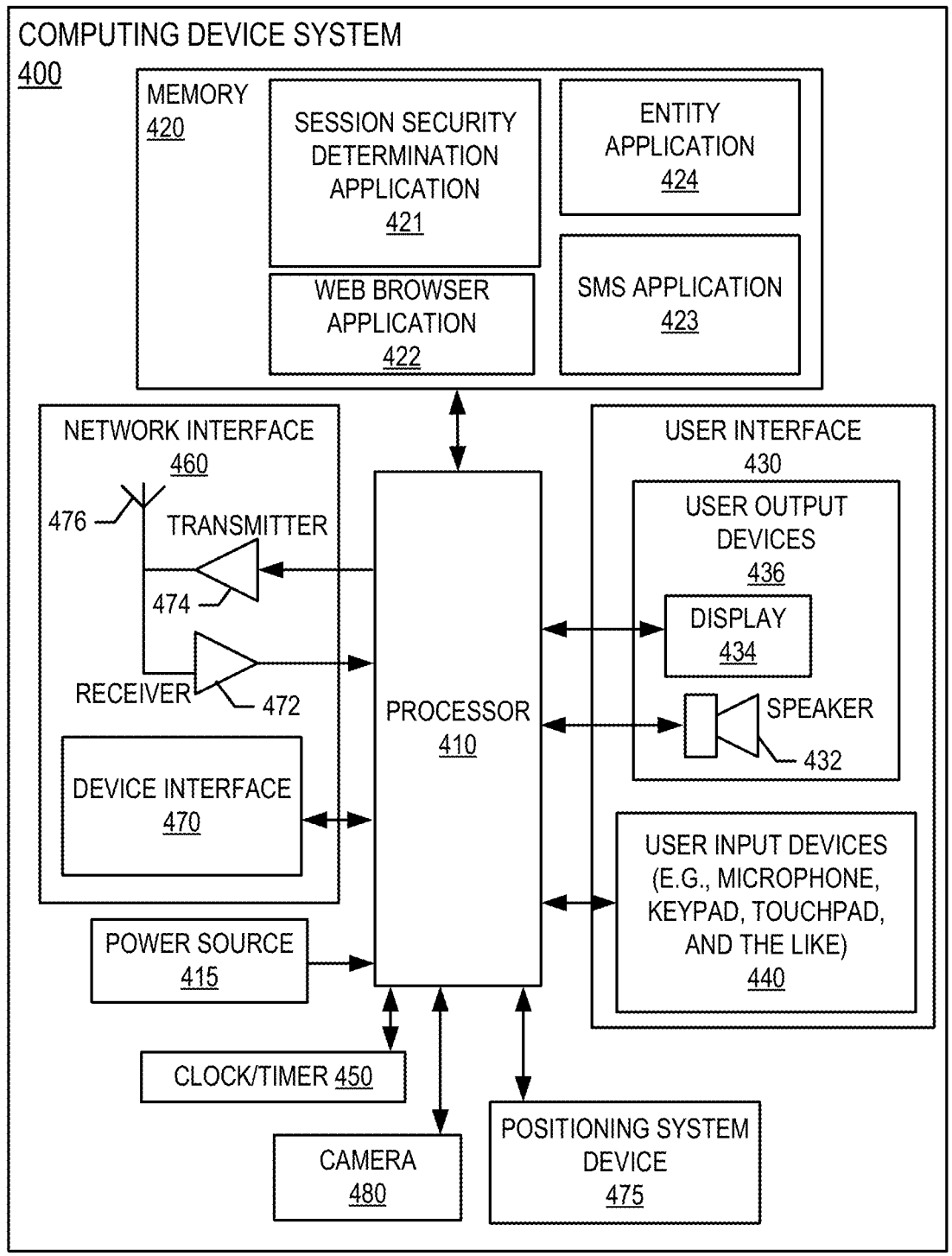
Figure 5:
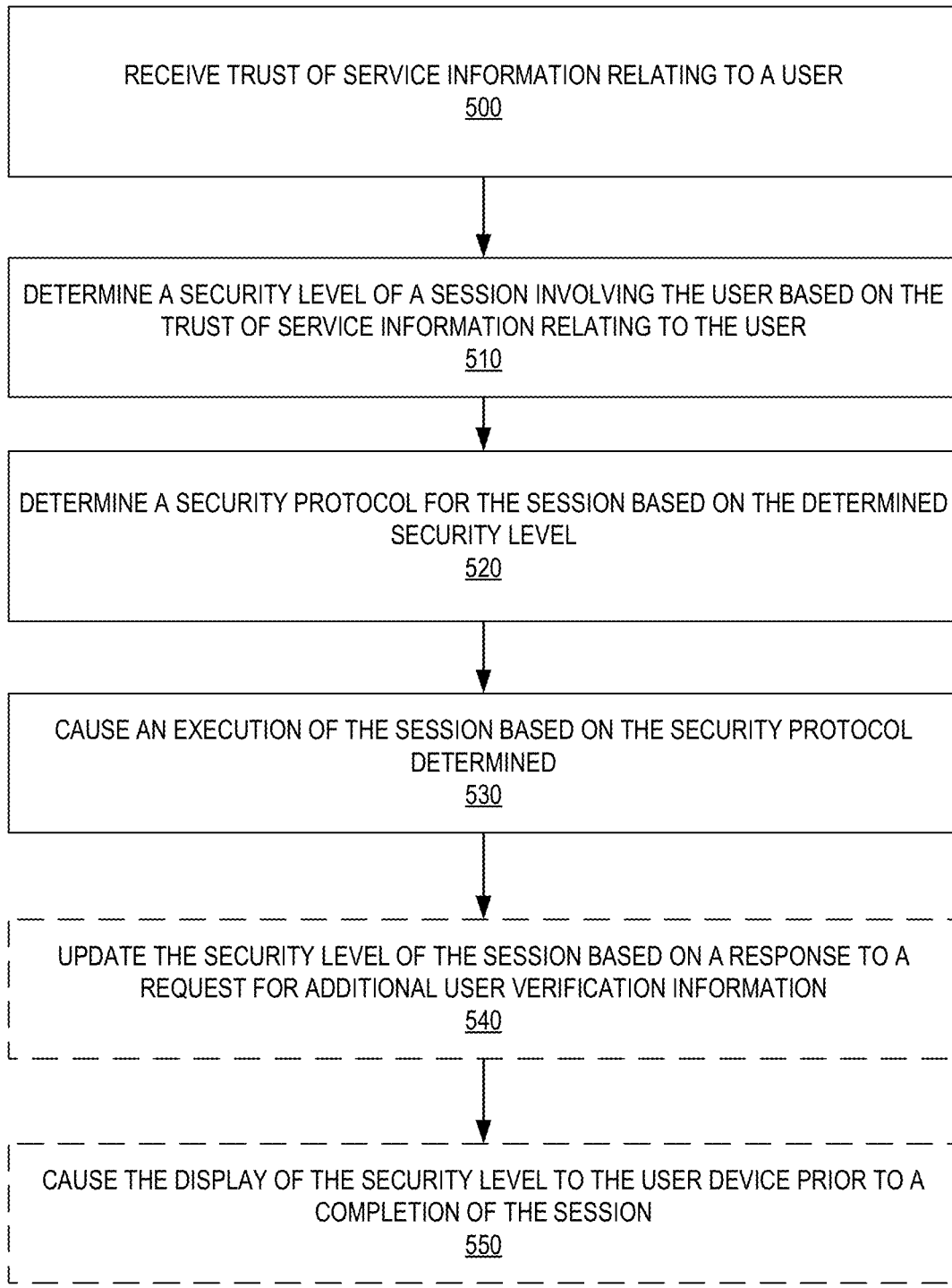

Having thus described embodiments of the disclosure in general terms, reference will now be made the accompanying drawings, wherein:

FIG. 1 provides a block diagram illustrating a system environment for monitoring network security in a mesh network, in accordance with embodiments of the present disclosure;

FIG. 2 provides a block diagram illustrating the entity system 200 of FIG. 1, in accordance with embodiments of the present disclosure;

FIG. 3 provides a block diagram illustrating a session security determination device 300 of FIG. 1, in accordance with embodiments of the present disclosure;

FIG. 4 provides a block diagram illustrating the computing device system 400 of FIG. 1, in accordance with embodiments of the present disclosure; and FIG. 5 provides a flowchart illustrating a method of monitoring network security in a mesh network in accordance with embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Mesh network communications include a mixture of devices of different types and ownership. Therefore, mesh network can be difficult to secure, as a single entity rarely, if ever, has administrative access to all devices on the mesh network. Mesh networks are integral for the interconnected internet world, as communication between entity systems and user devices is often necessary to allow for communications, such as transactions. The security of mesh networks directly affects entities potential loss, as often transactions are carried out without any additional communication outside of the mesh network. As such, the higher the level of security in a mesh network, the less potential loss for an entity during a transaction.

Various embodiments of the present disclosure allow for the security of a mesh network to be determined without having to receive administrative access to each device on the mesh network. To do this, various embodiment requests trust of service information from a user device to determine the security level of a given user device for a given session (e.g., a transaction), and based on the security level, the amount of user access is determined. Therefore, suspicious user devices are not allowed full session access, resulting in reduced or no access. For example, for a potential transaction, a suspicious user device may not be allowed to execute a transaction or the transaction amount limit is less than the user's traditional limit. The security measures of various embodiments allow for increased security without drastic structural changes to mesh network communications (e.g., the security is monitored without requiring administrative access to each device).

FIG. 1 provides a block diagram illustrating a system environment 100 for monitoring network security in a mesh network by analyzing IP stack layer information in communications. As illustrated in FIG. 1, the environment 100 includes a session security determination device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The session security determination device 300 is a system of the present disclosure for performing one or more process steps described herein. In some embodiments, the session security determination device 300 may be an independent system. In some embodiments, the session security determination device 300 may be a part of the entity system 200. For example, the method of FIG. 5 may be carried out by the entity system 200, the transaction security determination device 300, the computing device system 400, and/or a combination thereof.

The session security determination device 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the session security determination device 300 is configured to communicate information or instructions with the entity system 200, and/or the computing device system 400 across the network 150. While the entity system 200, the session security determination device 300, and the computing device system 400 are illustrated as separate components communicating via network 150, one or more of the components discussed here may be carried out via the same system (e.g., a single system may include the entity system 200 and the session security determination device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the session security determination device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a session security determination application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the session security determination application 250, the one or more entity application 270 to perform certain logic, data-extraction, and data-storing functions of the entity system 200 described herein, as well as communication functions of the entity system 200.

The network server application 240, the session security determination application 250, and the one or more entity applications 270 are configured to store data in the data repository 280 or to use the data stored in the data repository 280 when communicating through the network communication interface 210 with the session security determination device 300, and/or the computing device system 400 to perform one or more process steps described herein. In some embodiments, the entity system 200 may receive instructions from the session security determination device 300 via the session security determination application 250 to perform certain operations. The session security determination application 250 may be provided by the session security determination device 300. The one or more entity applications 270 may be any of the applications used, created, modified, facilitated, and/or managed by the entity system 200.

FIG. 3 provides a block diagram illustrating the session security determination device 300 in greater detail, in accordance with various embodiments. As illustrated in FIG. 3, in one embodiment, the session security determination device 300 includes one or more processing devices 320 operatively coupled to a network communication interface 310 and a memory device 330. In certain embodiments, the session security determination device 300 is operated by an entity, such as a financial institution. In some embodiments, the session security determination device 300 is owned or operated by the entity of the entity system 200. In some embodiments, the session security determination device 300 may be an independent system. In alternate embodiments, the session security determination device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the session security determination device 300 described herein. For example, in one embodiment of the session security determination device 300, the memory device 330 includes, but is not limited to, a network provisioning application 340, a data gathering application 350, a security protocol engine 360, an image processing engine 365, an artificial intelligence engine 370, a session security determination executor 380, and a data repository 390 comprising any data processed or accessed by one or more applications in the memory device 330. The computer-executable program code of the network provisioning application 340, the data gathering application 350, the security protocol engine 360, the image processing engine 365, the artificial intelligence engine 370, and the session security determination executor 380 may instruct the processing device 320 to perform certain logic, data-processing, and data-storing functions of the session security determination device 300 described herein, as well as communication functions of the session security determination device 300.

The security protocol engine 360, the artificial intelligence engine 365, and/or the session security determination executor 380 may alone, or in combination, be configured to determine the security level for a given session based on trust of service information provided. The security protocol engine 360, the artificial intelligence engine 365, and/or the session security determination executor 380 may include a security database generated to assist in determining a security level. The security database may include known security details that correspond with malfeasant and/or trustworthy activity. The security database may be generated and/or updated using machine learning processes that incorporate prior malfeasant and/or trustworthy activity. For example, the results of the operations discussed in reference to FIG. 5 may be provided to the security database to allow said security database to be updated. The security database may also include known malfeasant activity indicators (e.g., certain geographic locations or type of attempted transactions).

The security database may also include information relating to a given user, such as past trust of service information from previous sessions in order to compare to the trust of service information of the current session. In some embodiments, the determination of the security level discussed in reference to FIG. 5 may be based on the actions of the user related to the given session. Additionally or alternatively, the determination of the security level discussed in reference to FIG. 5 may be based on the actions of the other users (e.g., such as users making similar types of sessions).

The network provisioning application 340, the data gathering application 350, the security protocol engine 360, the image processing engine 365, the artificial intelligence engine 370, and the session security determination executor 380 are configured to invoke or use the data in the data repository 390 when communicating through the network communication interface 310 with the entity system 200, and/or the computing device system 400. In some embodiments, the network provisioning application 340, the data gathering application 350, the security protocol engine 360, the image processing engine 365, the artificial intelligence engine 370, and the session security determination executor 380 may store the data extracted or received from the entity system 200, and the computing device system 400 in the data repository 390. In some embodiments, the network provisioning application 340, the data gathering application 350, the security protocol engine 360, the image processing engine 365, the artificial intelligence engine 370, and the session security determination executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a session security level determination application 421, entity application 424. These applications also typically instructions to a graphical user interface (GUI) on the display 430 that allows the user 110 to interact with the entity system 200, the session security determination device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the session security level determination application 421 provided by the session security determination device 300 allows the user 110 to access the session security determination device 300. In some embodiments, the entity application 424 provided by the entity system 200 and the session security level determination application 421 allow the user 110 to access the functionalities provided by the session security determination device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIG. 5, a method of monitoring network security in a mesh network is provided. The method may be carried out by a system discussed herein (e.g., the entity system 200, the session security determination device 300, and/or the computing device system 400). An example system may include at least one non-transitory storage device and at least one processing device coupled to the at least one non-transitory storage device. In such an embodiment, the at least one processing device is configured to carry out the method discussed herein.

The operations discussed in reference to FIG. 5 are discussed in reference to monitoring security of a session. However, various other communications between devices on network could be secured and verified in similar ways as discussed herein. The operations discussed herein can be carried out for devices on a network without any advanced communication or interrogation necessary. For example, the operations carried out may be completed on a session with a user device without having access to the firewall of the given user device. An example session discussed herein is a transaction between the system and a user device.

Referring now to Block 500 of FIG. 5, the method may include receiving trust of service information relating to a user. The trust of service information relating to the user includes one or more security details associated with at least one of a user device or a user network associated with the user. During a communication between the system and a user device, such as a potential transaction, the system and user device may exchange information relating to the potential transaction. Said information exchanged may also include information relating to the user device associated with the user, such as network connection type, location, user device type, and/or the like. The trust of service information may be metadata provided to the system (e.g., include account information, user device location, user device network type, time of log-in, etc.) Additional network environment data may also be received.

The trust of service information may be received by the system during a communication within the Open Systems Interconnection model (OSI model). As such, the request and/or receiving of the trust of service information may be within a given layer of the OSI model. The trust of service information may be requested and/or received by the system during the session layer of data communication. Additionally or alternatively, the trust of service information may be requested and/or received by the system during the transport layer of data communication. As the trust of service information is provided during the communication outlined by the OSI model, the system can obtain the trust of service information without requiring administrative device control and/or access of the user device. The process detailed in FIG. 5 may be carried out as an additional sub-layer within the OSI model communication.

In various embodiments, the system may request the trust of service information from the user device (e.g., during a traditional handshake between the system and the user device). The user device may provide said trust of service information to the system (e.g., such as during the transport or session layer of an OSI model communication). The trust of service information may be provided by the user device without allowing the system additional access to the user device or network (e.g., without allowing the system access to the firewall).

Referring now to Block 510 of FIG. 5, the method may include determining a security level of a session involving the user based on the trust of service information relating to the user. Based on the trust of service information, the system may determine the security level of a session (e.g., a transaction). The security level determined indicates the potential for malicious activity. The system may be capable of placing the session or session into one of two or more security levels for the confidence in the session. For example, a given transaction or other session may be labeled as high suspicion or low suspicion. Various embodiments may have different number of security levels (e.g., high, medium, and low suspicion).

The security level of the transaction or other session may be determined based on trust of service information provided. The security protocol engine 360, the artificial intelligence engine 365, and/or the session security determination executor 380 discussed in reference to FIG. 3 above may include a security database generated to assist in determining a security level. The security database may include known security details that correspond with malfeasant and/or trustworthy activity.

The security database may be generated and/or updated using machine learning processes that incorporate prior malfeasant and/or trustworthy activity. For example, the results of the operations discussed in reference to FIG. 5 may be provided to the security database to allow said security database to be updated. The security database may also include known malfeasant activity indicators (e.g., certain geographic locations or type of attempted transactions).

The security database may also include information relating to a given user, such as past trust of service information from previous transactions or other sessions in order to compare to the trust of service information of the current session. In some embodiments, the determination of the security level may be based on the actions of the user related to the given session. For example, the trust of service information provided for a given transaction or other session may be compared with trust of service information provided by the same user in a previous transaction or other session. In an instance in which the trust of service information for the user is different than a previous trust of information for the same user, the security level may result in a higher suspicion level. For example, the security level may be high suspicion in an instance in which the location of the user does not match the location of the user in past sessions (e.g., past transactions).

The determination of the security level may be based on previous malfeasant activity. For example, the security level may be a higher suspicion level in an instance in which the trust of service information is similar to or the same as the trust of service information of known malfeasant activity.

The trust of service information may be compared to trust of service information of similar types of transactions or other sessions. For example, the system may compare one or more security details of the trust of service information with one or more security details of a malfeasant session of the same type (e.g., malfeasant actors may be using similar or the same location information for multiple similar malfeasant attempts). In various embodiments, the determination of the security level may be based on both past trust of service information for the specific user, as well as past trust of service information of other users.

The security level may also be determined based on the network type of the user device. The trust of service information may indicate whether the network connection of the user is secured or unsecured. In an instance in which the network connection is secured, the amount of security may also be indicated. A more secure network connection of the device may result in a lower suspicion security level.

Referring now to Block 520 of FIG. 5, the method may include determining a security protocol for the session based on the determined security level. The security level indicates the confidence level of the session. The security protocol determines at least one of a user access level or an additional security measure based on the security level.

Various embodiments of the present disclosure may allow, restrict, or limit user access during a session based on the given security level. The restriction of user access may include limiting the transaction amount allowable for a given user. For example, the system may have a threshold security level in order to receive normal access to a given session. Additionally, the system may have a security level threshold in which the transaction or other session is allowed to occur in reduced capacity (e.g., a transaction at a value less than a typical user limit). In some instances, the system may have a threshold security level in which the transaction or other session is not allowed to occur in any capacity.

In an example in which the potential security levels are high suspicion, medium suspicion, and low suspicion, the system may be configured to allowed full access to a user in an instance in which the security level is low suspicion (e.g., the user may be able to approve a transaction up to the given user's limit). However, in an instance in which the security level is medium suspicion, the system may be configured to limit the user access (e.g., the system may limit the transaction value to less than the given user's limit). Additionally, in the same example, the system may not allow any transaction or other session to continue in an instance in which the security level is high suspicion (e.g., the transaction is not approved and user receives a message that the transaction is not approved due to potential malfeasant activity).

In some embodiments, the system may implement additional security measures in response to a given security level. For example, in an instance in which a session is labeled as high suspicion, the system may request additional user verification information in order to update the security level. The additional user verification information requested may include log-in information, user identification information, two-factor authentication, and/or the like. For example, in an instance the security level is high suspicion, the system may request the user to enter user login information in order to confirm the identity. In another example, the system may request the user verify an email or text message code. In response to the additional user verification information, the system may be configured to determine whether the security level should be updated (e.g., the user may verify an email or text message code indicating a lower potential for malfeasant activity). As discussed in referenced to Block 540 of FIG. 5 below, the security level of the session may be updated based on a response to the request for additional user verification information.

In some embodiments, the system may be configured to provide the user device with one or more additional security measures that could change the security level. For example, in an instance in which the security level indicates a high suspicion level, the user may be notified that they need to contact the system entity (e.g., the user account may be locked out and told to call or contact the entity in order to unlock said account). Various automated additional security measures may be implemented to verify the user device associated with the user.

Referring now to Block 530 of FIG. 5, the method may include causing an execution of the session based on the security protocol determined. The session may be carried out with reduced access based on the determined security protocol. For example, the security protocol may determine that a session can only be carried out at a certain value less than the given user's typical amount. The session may have one or more reduced capacities based on the security protocols. For example, certain products and/or programs may not be available in a security protocol in which the user access is reduced. The operations discussed herein may be repeated for each session of the user. For example, a user may have a different user experience based on different trust of service information. For example, a user device that is a desktop computer connected to a secured connection may provide a different user experience than a user device that is a mobile device that is connected to an unsecured connection.

Referring now to optional Block 540 of FIG. 5, the method may include updating the security level of the session based on a response to a request for additional user verification information. The method may also include updating the security level of the tsession based on a response to the request for additional user verification information. The additional security measures may be carried out before and/or after the security protocol is determined. In an instance in which the security protocol has already been determined, the security protocol may also be updated based on the updated security level of the session. The request for additional user verification information may be provided to the user device (e.g., transmitted to the user device and displayed on said user device user interface).

Referring now to optional Block 550 of FIG. 5, the method may include causing the display of the security level to the user device prior to a completion of the session. The system may cause the transmission of a notification to the user device that the security level has resulted in a security protocol that has reduced the user access to a given session. For example, the user interface may display a message to the user device that indicates the restrictions implemented due to the security level (e.g., the user device may display the transaction value limit of the given session). In some embodiments, the security level and/or security protocol may be provided to the user device. As such, the security level and/or the security protocol may be provided to the user via the user device. In some instances, the security level and/or security protocol may only be provided to the user in an instance in which the security protocol reduces the user access to a given session. Additionally or alternatively, the user device may provide an indication of the security level and/or security protocol regardless of the given security level and/or security protocol.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for monitoring network security in a mesh network, the system comprising:
  at least one non-transitory storage device; and
  at least one processing device coupled to the at least one non-transitory storage device, wherein the at least one processing device is configured to:
    receive trust of service information relating to a user, wherein the trust of service information comprises one or more security details associated with at least one of a user device or a user network associated with the user;
process the trust of service information using a machine learning model, wherein the machine learning model is configured to generate a security database and update information of the security database, wherein the information of the security database comprises historical trust of service information and data relating to known malfeasant activity;
based on the trust of service information relating to the user and the information of the security database, determine, using the machine learning model, a security level of a session involving the user;
based on the determined security level, determine a security protocol for the session, wherein the security protocol determines at least one of a user access level or an additional security measure;
cause an execution of the session based on the security protocol determined;
receive additional trust of service information during execution of the security protocol and update the determined security level during execution; and
display the updated determined security level to a user device prior to completion of the session.

2. The system of claim 1, wherein the trust of service information is received from the user device associated with the user.

3. The system of claim 2, wherein the trust of service information comprises at least one of a user device location or a user device network type.

4. The system of claim 1, wherein the security protocol comprises limiting a transaction amount based on the security level.

5. The system of claim 1, wherein the trust of service information is stored within a stack layer of a communication with the user device.

6. The system of claim 1, wherein the additional security measure comprises requesting additional user verification information, and wherein the at least one processing device is further configured to update the security level of the session based on a response to the request for additional user verification information.

7. The system of claim 1, wherein the at least one processing device is further configured to cause a display of the security level to the user device prior to a completion of the session.

8. A computer program product for monitoring network security in a mesh network, the computer program product comprising at least one non-transitory computer-readable medium having computer-readable program code portions embodied therein, the computer-readable program code portions comprising:
an executable portion configured to receive trust of service information relating to a user, wherein the trust of service information comprises one or more security details associated with at least one of a user device or a user network associated with the user;
an executable portion configured to process the trust of service information using a machine learning model, wherein the machine learning model is configured to generate a security database and update information of the security database, wherein the information of the security database comprises historical trust of service information and data relating to known malfeasant activity;
an executable portion configured to determine, using the machine learning model, a security level of a session involving the user based on the trust of service information relating to the user and the information of the security database;
an executable portion configured to determine a security protocol for the session based on the determined security level, wherein the security protocol determines at least one of a user access level or an additional security measure;
an executable portion configured to cause an execution of the session based on the security protocol determined;
an executable portion configured to receive additional trust of service information during execution of the security protocol and update the determined security level during execution; and
an executable portion configured to display the updated determined security level to a user device prior to completion of the session.

9. The computer program product of claim 8, wherein the trust of service information is received from the user device associated with the user.

10. The computer program product of claim 9, wherein the trust of service information comprises at least of a user device location or a user device network type.

11. The computer program product of claim 8, wherein the security protocol comprises limiting a transaction amount based on the security level.

12. The computer program product of claim 8, wherein the trust of service information is stored within a stack layer of a communication with the user device.

13. The computer program product of claim 8, wherein the additional security measure comprises requesting additional user verification information, and wherein the computer-readable program code portions further comprise an executable portion configured to update the security level of the session based on a response to the request for additional user verification information.

14. The computer program product of claim 8, wherein the computer-readable program code portions further comprise an executable portion configured to cause a display of the security level to the user device prior to a completion of the session.

15. A computer-implemented method for monitoring network security in a mesh network, the method comprising:
receiving trust of service information relating to a user, wherein the trust of service information comprises one or more security details associated with at least one of a user device or a user network associated with the user;
processing the trust of service information using a machine learning model, wherein the machine learning model is configured to generate a security database and update information of the security database, wherein the information of the security database comprises historical trust of service information and data relating to known malfeasant activity;
based on the trust of service information relating to the user and the information of the security database, determining, using the machine learning model, a security level of a session involving the user;
based on the determined security level, determining a security protocol for the session, wherein the security protocol determines at least one of a user access level or an additional security measure;
causing an execution of the session based on the security protocol determined;
receiving additional trust of service information during execution of the security protocol and update the determined security level during execution; and displaying the updated determined security level to a user device prior to completion of the session.

16. The method of claim 15, wherein the trust of service information is received from the user device associated with the user.

17. The method of claim 16, wherein the trust of service information comprises at least one of a user device location or a user device network type.

18. The method of claim 15, wherein the security protocol comprises limiting a transaction amount based on the security level.

19. The method of claim 15, wherein the trust of service information is stored within a stack layer of a communication with the user device.

20. The method of claim 15, wherein the additional security measure comprises requesting additional user verification information, and wherein the method further comprises updating the security level of the session based on a response to the request for additional user verification information.

* * * * *